(12) United States Patent
Pillans et al.

(10) Patent No.: US 12,512,025 B2
(45) Date of Patent: Dec. 30, 2025

(54) HEAD-MOUNTED DEVICE WITH CONTENT DIMMING FOR MASKING NOISE

(71) Applicant: Apple Inc., Cupertino, CA (US)

(72) Inventors: Luke A Pillans, San Diego, CA (US); Simon Fortin-Deschenes, Santa Clara, CA (US); Seyedkoosha Mirhosseini, Santa Clara, CA (US); Christian I Moore, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/660,524

(22) Filed: May 10, 2024

(65) Prior Publication Data

US 2025/0201153 A1  Jun. 19, 2025

Related U.S. Application Data

(60) Provisional application No. 63/611,608, filed on Dec. 18, 2023.

(51) Int. Cl.
*G09G 3/00* (2006.01)

(52) U.S. Cl.
CPC ..... *G09G 3/001* (2013.01); *G09G 2320/0626* (2013.01)

(58) Field of Classification Search
CPC .......... G09G 3/001; G09G 2320/0626
See application file for complete search history.

(56) References Cited

U.S. PATENT DOCUMENTS

| 9,953,556 B2 * | 4/2018 | Sridharan | G09G 3/2003 |
| 9,964,770 B2 * | 5/2018 | Guo | G02B 27/0176 |
| 10,203,762 B2 * | 2/2019 | Bradski | H04N 21/414 |
| 12,020,413 B2 * | 6/2024 | Trung Vo | G06T 5/92 |
| 2013/0278631 A1 * | 10/2013 | Border | G06F 3/04842 |
| | | | 345/633 |
| 2014/0132484 A1 * | 5/2014 | Pandey | G06T 11/001 |
| | | | 345/8 |

(Continued)

FOREIGN PATENT DOCUMENTS

| KR | 20150079004 A * | 7/2015 | B60K 35/00 |
| WO | WO-2017084091 A1 * | 5/2017 | G02B 27/01 |
| WO | WO-2019046334 A1 * | 3/2019 | G09G 3/003 |

*Primary Examiner* — Ke Xiao
*Assistant Examiner* — Jennifer L Zubajlo
(74) *Attorney, Agent, or Firm* — Treyz Law Group; Jason Tsai

(57) ABSTRACT

A method of operating an electronic device to mask noise at low scene brightness levels is provided. The method can include acquiring images of a scene and determining a scene brightness level of the acquired images. In response to determining that the scene brightness level is in a first range, the acquired images can be displayed as passthrough content in accordance with a 1:1 nits-to-nits mapping where the perceived brightness of the passthrough content matches the scene brightness level. In response to determining that the scene brightness is less than the first range, the perceived brightness of the passthrough content can be dimmed to be less than the scene brightness level. The method can also include generating virtual content. The passthrough content can be adjusted in accordance with a first scene-brightness-to-display-brightness profile, whereas the virtual content can be adjusted in accordance with a second scene-brightness-to-display-brightness profile.

22 Claims, 8 Drawing Sheets

(56) References Cited

U.S. PATENT DOCUMENTS

| | | | | |
|---|---|---|---|---|
| 2017/0213494 | A1* | 7/2017 | Carlsson | G09G 3/2007 |
| 2019/0204572 | A1* | 7/2019 | Hermalyn | H04N 23/55 |
| 2021/0272363 | A1* | 9/2021 | Nguyen | G06T 19/006 |
| 2021/0286502 | A1* | 9/2021 | Lemay | G06T 19/006 |
| 2021/0358187 | A1* | 11/2021 | Kuang | H04N 13/344 |
| 2022/0207840 | A1* | 6/2022 | Cansizoglu | G06V 20/20 |
| 2022/0318964 | A1* | 10/2022 | Kim | G09G 3/2007 |
| 2022/0327672 | A1* | 10/2022 | Vo | G06T 5/40 |
| 2022/0373796 | A1* | 11/2022 | Meisenholder | G06V 20/20 |
| 2023/0039667 | A1* | 2/2023 | Vo | H04N 1/6088 |
| 2023/0049334 | A1* | 2/2023 | Chen | H04N 9/64 |
| 2023/0073970 | A1* | 3/2023 | Lin | H04N 23/82 |
| 2023/0114043 | A1* | 4/2023 | Wan | G06F 3/04842 |
| | | | | 345/633 |
| 2023/0114704 | A1* | 4/2023 | Chen | G06V 20/20 |
| 2024/0029218 | A1* | 1/2024 | Jia | G06T 5/92 |
| 2024/0107113 | A1* | 3/2024 | Ruangchan | H04N 21/816 |
| 2024/0203306 | A1* | 6/2024 | Pieri | G09G 5/14 |
| 2024/0275930 | A1* | 8/2024 | Vo | H04N 9/73 |
| 2024/0402802 | A1* | 12/2024 | Brown | G06F 3/011 |
| 2025/0157157 | A1* | 5/2025 | Price | G06T 19/006 |

* cited by examiner

HEAD-MOUNTED DEVICE WITH CONTENT DIMMING FOR MASKING NOISE

This application claims the benefit of U.S. Provisional Patent Application No. 63/611,608, filed Dec. 18, 2023, which is hereby incorporated by reference herein in its entirety.

FIELD

This relates generally to electronic devices, and, more particularly, to electronic devices such as head-mounted devices.

BACKGROUND

Electronic devices such as head-mounted devices can have cameras for capturing a video feed of an external scene, a graphics rendering unit for generating virtual content, and one or more displays for presenting the captured video feed of the scene and/or the generated virtual content to a user.

It can be challenging to design a head-mounted device that displays high quality images in a variety of usage contexts. For example, consider a scenario in which a user is operating the head-mounted device in a dark environment. If care is not taken, the video feed of the dark environment being captured by the cameras can appear noisy on the displays and thus degrade the overall viewing experience for the user. It is within this context that the embodiments herein arise.

SUMMARY

An aspect of the disclosure provides a method of operating an electronic device such as a head-mounted device. The method can include acquiring images of a scene, determining a scene brightness level of the acquired images, displaying the acquired images in accordance with a first scene-to-display brightness mapping in response to determining that the scene brightness level is in a first range, and displaying the acquired image in accordance with a second scene-to-display brightness mapping different than the first scene-to-display brightness mapping in response to determining that the scene brightness is less than the first range. The first scene-to-display brightness mapping may be a 1:1 nits-to-nits mapping implemented with a tone-mapping algorithm. The second scene-to-display brightness mapping may be a 1:X nits-to-nits mapping, where X is less than 1 so that the brightness of the displayed images is less than the scene brightness level.

An aspect of the disclosure provides a method of operating an electronic device that includes acquiring images of a scene from which passthrough content is generated, generating virtual content, controlling a brightness of the passthrough content in accordance with a first scene-brightness-to-display-brightness profile configured to mask noise in the acquired images when a scene brightness level of the acquired images is below a threshold, and controlling a brightness of the virtual content in accordance with a second scene-brightness-to-display-brightness profile. A first portion of the first scene-brightness-to-display-brightness profile can coincide with a line having a slope of one, whereas a second portion of the first scene-brightness-to-display-brightness profile corresponding to scene brightness levels below the threshold can be lower than the line.

An aspect of the disclosure provides an electronic device that includes one or more cameras configured to acquiring images of a scene, an image signal processor configured to output passthrough content from the acquired images and to compute a scene brightness level of the acquired images, a graphics rendering subsystem configured to generate virtual content, a media merging subsystem configured to combine the passthrough content and the virtual content and to output corresponding merged video content, one or more displays configured to output the merged video content, and a brightness scaling subsystem configured to mask noise in the acquired images by dimming a brightness level of the passthrough content so that the brightness level of the passthrough content being presented on the one or more displays is less than the scene brightness level when the scene brightness level is less than a given threshold.

DETAILED DESCRIPTION

Figure 1:
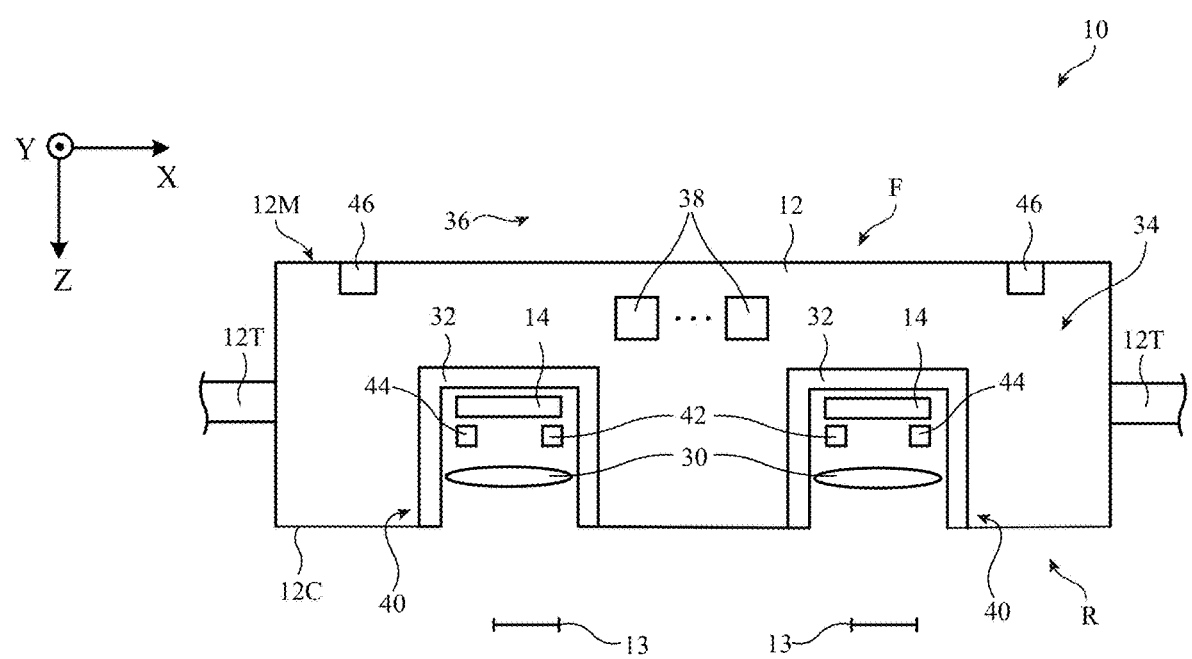
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

To help protect the privacy of users, any personal user information that is collected at device 10 may be handled using best practices. These best practices including meeting or exceeding any privacy regulations that are applicable. Opt-in and opt-out options and/or other options may be provided that allow users to control usage of their personal data.

Figure 2:
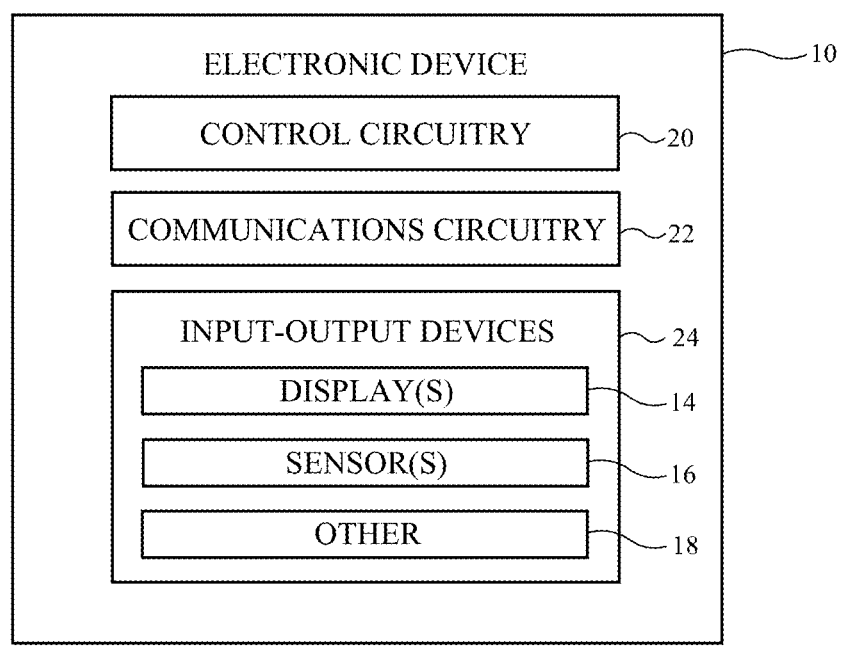
FIG. 2 is a schematic diagram of an illustrative electronic device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, virtual reality (VR) content can be presented by display 14. Virtual reality content may refer to content that only includes virtual objects within a virtual reality (computer-generated) environment. As another example, mixed reality (MR) content can be presented by display 14. Mixed reality content may refer to content that includes virtual objects and real objects from the real-world physical environment in which device 10 is being operated. As another example, only real-world content can be presented by display 14. The real-world content may refer to images being captured by one or more front-facing cameras (see, e.g., cameras 46 in FIG. 1) and passed through as a live feed to the user. The real-world content being captured by the front-facing cameras is therefore sometimes referred to as a camera passthrough feed, a (live) video passthrough feed, or a passthrough video feed (stream).

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

Images captured by the front-facing cameras of device 10 can exhibit a signal-to-noise ratio (SNR). The SNR of an image is generally defined as a ratio of the signal level to the noise level in the image. The signal level represents the overall signal strength of the actual image content, which depends on the intensity or brightness of the pixels in the image. The noise level represents the overall strength of any unwanted variation or interference in the image, which can arise due to image sensor limitations or imperfections in the imaging process. A higher SNR typically results in a clearer and higher quality image since the signal strength is much stronger than the noise. Conversely, a lower SNR means that the noise is more pronounced relative to the signal strength of the actual image content. An image with low SNR can appear noisy with random speckles, graininess, or other unwanted distortions and can lead to loss of image detail and fidelity.

Figure 3:
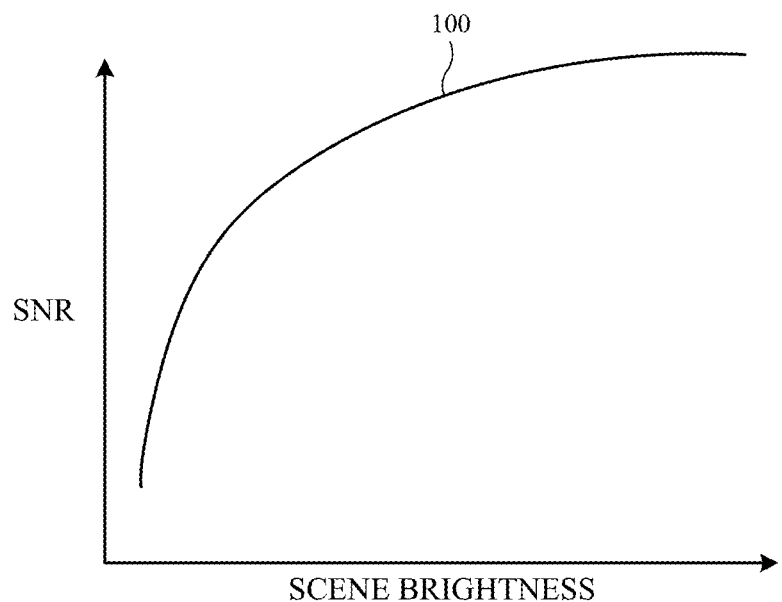
FIG. 3 is a diagram plotting signal-to-noise ratio (SNR) of an image as a function of scene brightness in accordance with some embodiments.

FIG. 3 is a diagram plotting signal-to-noise ratio (SNR) of an image as a function of scene brightness. As shown by curve 100 in FIG. 3, at high scene brightness levels, the SNR of the corresponding captured image(s) of the scene can be high. At low scene brightness levels, however, the SNR of the corresponding capture image(s) of the scene can be relatively low, as shown by the steep drop off of curve 100 at low scene brightness levels. This can be problematic when device 10 is being operated in a dark environment (e.g., when the user is wearing device 10 in a dark room). In such scenarios, the images being captured by the front-facing cameras can exhibit low SNR, resulting in a noisy video feed being presented on display(s) 14.

Figure 4:
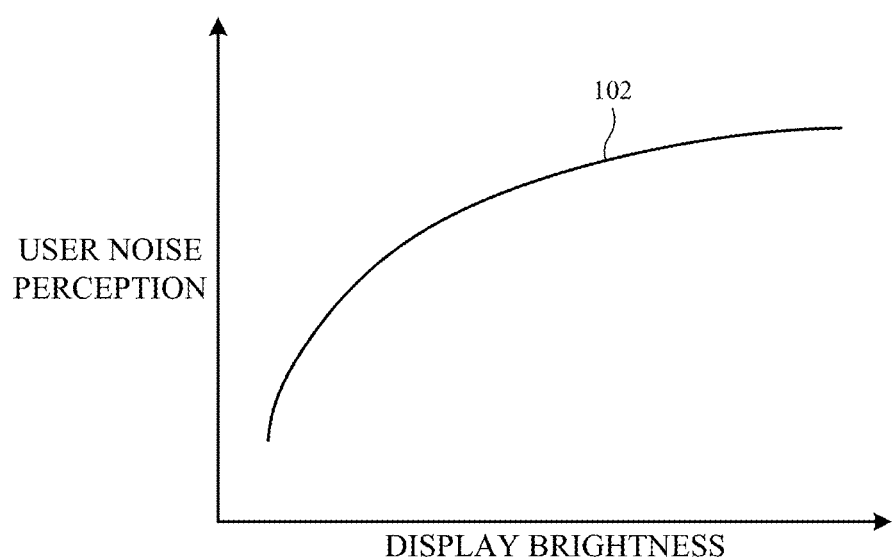
FIG. 4 is a diagram plotting noise perception as a function of display brightness in accordance with some embodiments.

FIG. 4 is a diagram plotting noise perception as a function of display brightness in accordance with some embodiments. Noise perception here on the y-axis can refer to the way an average user perceives the level of noise in an image or video stream. A higher level of noise perception means that the user is more able to perceive or is more sensitive to the amount of noise in the content being viewed. A lower level of noise perception means that the user is less able to perceive or is less sensitive to the amount of noise in the content being viewed. The display brightness on the x-axis refers to the brightness level of display(s) 14 in device 10. Turning up or increasing the overall brightness level of the display will cause the corresponding content on the display to appear brighter, whereas turning down or reducing the overall brightness level of the display will cause the corresponding content on the display to appear dimmer.

A shown by curve 102 in FIG. 4, at high(er) display brightness levels, the user's perception of noise is relatively high. At low(er) display brightness levels, however, the user's perception of noise decreases, as shown by the drop off of curve 102 at low display brightness levels. In other words, the user may be less sensitive to noise when the display brightness is reduced. In accordance with an embodiment, the reduced noise perception at low(er) display brightness levels can be leveraged to help compensate/mitigate the degraded SNR of images of darker scenes. For example, the brightness level of display(s) 14 can be dimmed beyond typical levels when capturing dark scenes or environments. Operating device 10 in this way can be technically advantageous and beneficial to lower the user's perception or sensitivity to noise to help offset the degraded SNR of the images of dark scenes being displayed (e.g., the display brightness can be dimmed to perceptually mask the elevated noise level in darker images).

In accordance with an embodiment, electronic device 10 such as a head-mounted device can be provided with software and/or hardware subsystems configured to selectively perform display brightness dimming for perceptually masking noise in images with degraded SNR. Such type of electronic device 10 is illustrated in FIG. 3. As shown in FIG. 3, device 10 can include one or more image sensors such as image sensors 50, an image signal processor such as image signal processor (ISP) 52, one or more processing (compute) units such as a graphics processing unit (GPU) 70, brightness adjustment subsystems such as brightness scaling block 62 and brightness scaling block 64, a brightness controller subsystem such as brightness dimming controller 60, a media merging subsystem such as media merging compositor 90, and one or more display(s) such as displays 14.

Image sensor(s) 50 may include one or more front-facing camera(s) and/or other cameras used to gather information on the external real-world environment surrounding device 10. Cameras 50 may represent one or more of front-facing cameras 46 in FIG. 1 and/or can represent any other external-facing or scene-facing cameras. A video feed output from cameras 50 can sometimes be referred to as raw acquired images, a raw video feed, a live video passthrough feed, or a live passthrough video stream. Cameras 50 are therefore sometimes referred to herein as passthrough cameras or scene cameras.

The raw images output from cameras 50 can be processed by image signal processor (ISP) 52 that is configured to perform image signal processing functions that only rely on the input of the live camera feed itself. For example, ISP block 52 may be configured to perform automatic exposure for controlling an exposure setting for the passthrough feed, tone mapping, autofocus, color correction, gamma correction, shading correction, noise reduction, black level adjustment, demosaicing, image sharpening, high dynamic range (HDR) correction, color space conversion, and/or other image signal processing functions to output a corresponding processed passthrough feed (e.g., a series of processed video frames). The processed images, sometimes referred to and defined herein as passthrough content, can be presented as a live video stream to the user via one or more displays 14.

The graphics processing unit (GPU) 70 can be optimized for graphics processing or graphics rendering operations. Graphics processing unit 70 may include highly parallelized processing cores configured to handle a wide range of computationally intensive tasks. A graphics rending subsystem such as graphics rendering engine 72 can be implemented on GPU 70. Graphics rendering engine 72, sometimes referred to as a graphics renderer or a graphics rendering pipeline, can be configured to render or generate virtual content (e.g., virtual reality content, augmented reality content, mixed reality content, or extended reality content) or may be used to carry out other graphics processing functions. The virtual (computer-generated) content output from the graphics rendering engine 72 can optionally be foveated based on the foveation information output from a dynamic foveation block (not shown in FIG. 5 in order to avoid obscuring the present embodiments).

Graphics renderer 72 can synthesize photorealistic or non-photorealistic images based on one or more 2-dimensional or 3-dimensional model(s) defined in a scene file that contains information on how to simulate a variety of features such as information on shading (e.g., how color and brightness of a surface varies with lighting), shadows (e.g., how to cast shadows across an object), texture mapping (e.g., how to apply detail to surfaces), reflection, transparency or opacity (e.g., how light is transmitted through a solid object), translucency (e.g., how light is scattered through a solid object), refraction and diffraction, depth of field (e.g., how certain objects can appear out of focus when outside the depth of field), motion blur (e.g., how certain objects can appear blurry due to fast motion), and/or other visible features relating to the lighting or physical characteristics of objects in a scene. Graphics renderer 72 can apply rendering algorithms such as rasterization, ray casting, ray tracing, radiosity, or other graphics processing algorithms.

The passthrough content output from ISP block 52 can be selectively adjusted by brightness scaling block 62. Brightness scaling block 62 may receive a passthrough content dimming factor from brightness dimming controller 60. If the passthrough content dimming factor is equal to zero, then brightness scaling block 62 is effectively bypassed without applying any brightness adjustment to the received passthrough content. As the passthrough content dimming factor is increased above zero, then brightness scaling block 62 may gradually apply an increasing amount of brightness dimming to the received passthrough content (e.g., to further reduce the overall brightness of the passthrough content by digitally scaling down all of the pixel values). Brightness scaling block 62 is therefore sometimes referred to as a passthrough content brightness dimming subsystem. Although the passthrough content brightness dimming block 62 is shown as being separate from ISP block 52, passthrough content brightness dimming block 62 can optionally be implemented as part of the ISP block 52.

The virtual content output from graphics rendering block 72 can be selectively adjusted by brightness scaling block 64. Brightness scaling block 64 may receive a virtual content dimming factor from brightness dimming controller 60. If the virtual content dimming factor is equal to zero, then brightness scaling block 64 is effectively bypassed without applying any brightness adjustment to the received virtual content. As the virtual content dimming factor is increased above zero, then brightness scaling block 64 may gradually apply an increasing amount of brightness dimming to the received virtual content (e.g., to further reduce the overall brightness of the virtual content by digitally scaling down all of the pixel values). Brightness scaling block 64 is therefore sometimes referred to as a virtual content brightness dimming subsystem. Although the virtual content brightness dimming block 64 is shown as being separate from graphics renderer 72, virtual content brightness dimming block 64 can optionally be implemented as part of the graphics renderer 72.

Media merging compositor 90 may receive the passthrough content from brightness scaling block 62, receive the virtual content from brightness scaling block 64, and may overlay, blend, or otherwise combine one or more portions of the received virtual content with the received passthrough content to obtain corresponding merged, blended, or composited video content. The merged video content, sometimes also referred to as a composited video feed, output from the media merging compositor 90 can then be presented on display(s) 14 to be viewed by the user of electronic device 10.

The passthrough content dimming factor for controlling the passthrough content brightness scaling block 62 and the virtual content dimming factor for controlling the virtual content brightness scaling block 64 are generated by brightness dimming controller 60. Brightness dimming controller 60 can be configured to analyze the passthrough content being processed at ISP block 52 and/or other image parameters associated with the passthrough content, including but not limited to the camera exposure time, an exposure target level, lens aperture (or f-stop), ISO sensitivity value, brightness histogram, white balance, color profile, flash light settings (e.g., if a strobe or continuous lighting on device 10 is activated), image stabilization capabilities (e.g., whether a camera and/or lens stabilization is enabled on device 10), etc. Based on these received parameters, brightness dimming controller 60 can determine whether to adjust the passthrough content dimming factor and/or the virtual content dimming factor. The amount by which controller 60 adjusts the passthrough content dimming factor and the virtual content dimming factor can be the same (e.g., the passthrough content dimming factor and the virtual content dimming factor can be equal and synchronized) or can be different (e.g. the passthrough content dimming factor can be different than the virtual content dimming factor at certain points in time). The way in which brightness dimming controller 60 adjusts the passthrough content dimming factor and the virtual content dimming factor is best understood in connection with FIGS. 6 and 7.

Figure 6:
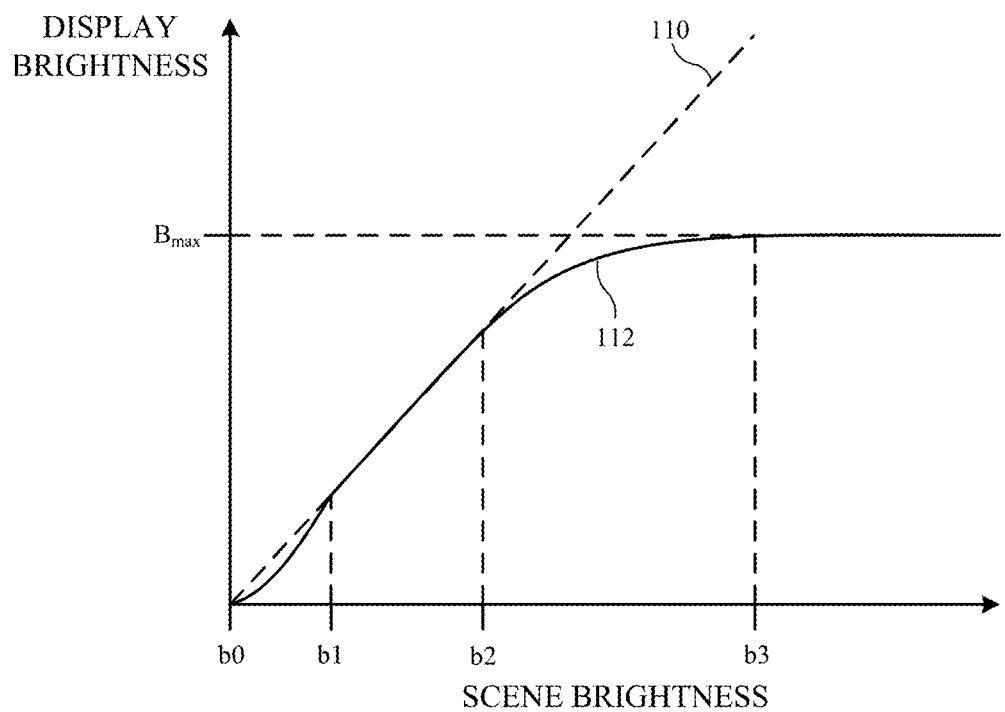
FIG. 6 is a diagram plotting display brightness as a function of scene brightness for passthrough content in accordance with some embodiments.

FIG. 6 is a diagram plotting the brightness of display(s) 14 as a function of scene brightness for displaying passthrough content. The brightness of displays 14 can range from a minimum display output level (e.g., 0 nits, 1 nits, 2 nits, or other minimal luminance value) to a maximum brightness output level Bmax. This range between the minimum display output level and Bmax is sometimes referred to and defined herein as the display brightness range or the display range. The maximum (peak) display brightness level Bmax can be limited to 100 nits, 150 nits, 200 nits, 300 nits, or other peak brightness level.

Dotted line 110 in FIG. 6 represents a relationship where the scene brightness level (i.e., the overall brightness or lux level of physical environment in which device 10 is being operated) is equal to the display brightness level. This corresponds to a direct luminance mapping, sometimes referred to and defined herein as a 1:1 nits-to-nits mapping, without any compression is provided to replicate or match what the user would have seen but for wearing device 10 (e.g., the perceived brightness of the scene as a whole as presented by displays 14 is comparable to what is seen with the naked eye). The slope of dotted line 110 is therefore equal to one. As an example where the scene brightness is equal to 50 nits, then the perceived brightness of the scene being displayed can also be adjusted to about 50 nits if nits-to-nits mapping were to be adhered. This can be achieved by perceptual tuning of a tone mapping algorithm implemented on image signal processor 52. Such 1:1 nits-to-nits mapping will thus provide a transparent user experience, where the user would perceive the same overall brightness (lux) whether or not the user is operating device 10 in a passthrough mode in a given environment or is viewing that environment with his/her naked eyes without device 10 mounted over the eyes, and is thus sometimes referred to herein as perceptual 1:1 nits matching. Such type of perceptual matching is illustrative. If desired, the 1:1 physical nits mapping can alternatively be implemented to ensure that the absolute brightness of display(s) 14 is matched with the absolute brightness of the scene as captured by the one or more sensors of device 10 (e.g., the display luminance can be matched with the scene luminance). Both types of perceptual 1:1 nits matching and physical (absolute) 1:1 nits matching are sometimes referred to and defined herein generically as 1:1 nits-to-nits (nits) mapping.

Curve 112 in FIG. 6 is a brightness profile that represents how brightness dimming controller 60 can adjust the passthrough content dimming factor in accordance with an embodiment. Curve 112, which plots a relationship between perceived display brightness to the overall scene brightness levels of captured images, is sometimes referred to and defined herein as a scene-brightness-to-display-brightness profile for the passthrough content. For images having high overall scene brightness levels exceeding scene brightness level b3, the perceived display brightness is capped out at Bmax. In other words, the display brightness remains fixed at Bmax for all scene brightness levels greater than or equal to b3 (see, e.g., the slope of curve 112 remains flat for scene brightness levels beyond b3). For images with overall scene brightness levels between b1 and b2, curve 112 may coincide with dotted line 110. In other words, a first scene-to-display brightness mapping such as 1:1 nits-to-nits mapping can be provided for a certain range of scene brightness levels between b1 and b2 (e.g., to set the display brightness equal to, about equal to, or perceptually equal to the scene brightness). For images with overall scene brightness levels ranging from b2 to b3, curve 112 may exhibit slope values that decrease from one (at scene brightness level b2) to zero (at scene brightness level b3).

For images having scene brightness levels ranging from b0 to b1 (e.g., at the lowest or very dark scene lux levels), curve 112 may dip below dotted line 110. In other words, a second scene-to-display brightness mapping that maps the scene brightness to a lower display brightness than the first (e.g., 1:1) scene-to-display brightness mapping (e.g., so that the perceived or absolute display brightness level is lower than the actual scene brightness level). As an example where the scene brightness is equal to 5 nits, the display brightness can be adjusted to 4 nits, 4.5 to 4.9 nits, 4 to 4.5 nits, less than 4 nits, or other display brightness level less than 5 nits. This additional dimming of the display relative to the scene brightness level may be achieved by adjusting the passthrough content dimming factor at brightness dimming controller 60. Thus, if the first scene-to-display brightness mapping is considered 1:1 nits matching, then the second scene-to-display brightness mapping can be considered less than 1:1 nits matching (e.g., 1:0.95 nits mapping, 1:0.9 nits mapping, 1:0.85 nits mapping, etc.).

For example, when the scene brightness is above b1, the passthrough control dimming factor may be equal to zero, effectively bypassing or deactivating the passthrough content brightness scaling block 62 (e.g., no brightness dimming is applied by block 62). When the scene brightness is below b1, brightness dimming controller 60 can increase the passthrough content dimming factor to some value to scale down or dim the brightness of the passthrough content to be displayed. Brightness level b1 is sometimes referred to as a scene brightness threshold. The passthrough content dimming factor can be adjusted to dim the passthrough content by 1-10%, 10-20%, 20-30%, 30-40%, 40-50%, or by other suitable amounts. Dimming the passthrough content at low scene brightness levels (e.g., at scene brightness levels less than a certain threshold b1) in this way can be technically advantageous and beneficial to perceptually mask the otherwise noticeable noise in passthrough content with degraded SNR.

The example of FIG. 6 in which curve 112 has a portion or segment colinear with dotted line 110 is illustrative. In other embodiments, curve 112 need not have any extended portion that is colinear with dotted line 110 (e.g., there might be at most one or two points along curve 112 intersecting with dotted line 110). In other words, device 10 need not include any extended operating region that provides 1:1 nits-to-nits mapping for the passthrough content.

Figure 7:
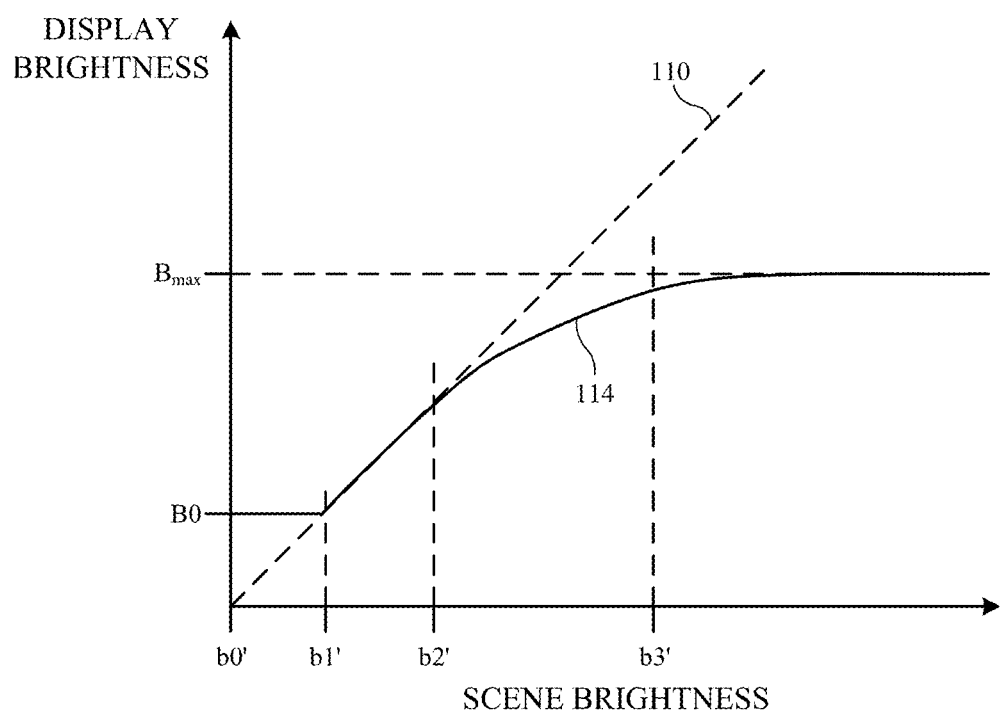
FIG. 7 is a diagram plotting display brightness as a function of scene brightness for virtual content in accordance with some embodiments.

FIG. 7 is a diagram plotting the brightness of display(s) 14 as a function of scene brightness for displaying virtual content. The perceived brightness of displays 14 can range from a minimum display output level (e.g., 0 nits, 1 nits, 2 nits, or other minimal luminance value) to a maximum brightness output level Bmax. This range between the minimum display output level and Bmax is sometimes referred to and defined herein as the display brightness range or the display range. The maximum (peak) display brightness level Bmax can be limited to 100 nits, 150 nits, 200 nits, 300 nits, or other peak brightness level.

Similar to FIG. 6, dotted line 110 in FIG. 7 represents a relationship where the scene brightness level (i.e., the overall brightness or lux level of physical environment in which device 10 is being operated) is equal to the perceived display brightness level. This corresponds to a direct luminance mapping, sometimes referred to and defined herein as a 1:1 nits-to-nits mapping, without any compression is provided to replicate or match what the user would have seen but for wearing device 10 (e.g., the perceived brightness of the scene as a whole as presented by displays 14 is comparable to what is seen with the naked eye). The slope of dotted line 110 is therefore equal to one. As an example where the scene brightness is equal to 38 nits, then the overall display brightness can also be adjusted to 38 nits if nits-to-nits mapping where to be adhered. This can be achieved by perceptual tuning of a tone mapping algorithm implemented on image signal processor 52. Such perceptual 1:1 nits matching approach will thus provide a transparent user experience, where the user would perceive the same overall brightness (lux) whether or not the user is operating device 10 in a passthrough mode in a given environment or is viewing that environment with his/her naked eyes without device 10 mounted over the eyes. Such type of perceptual nits matching is illustrative. If desired, the 1:1 physical nits mapping can alternatively be configured to ensure that the absolute brightness of display(s) 14 is matched with the absolute brightness of the scene as captured by the one or more sensors of device 10 (e.g., the display luminance can be matched with the scene luminance).

Curve 114 in FIG. 7 is a brightness profile that represents how brightness dimming controller 60 can adjust the virtual content dimming factor in accordance with an embodiment. Curve 114, which plots a relationship between display brightness to the overall scene brightness levels of captured images, is sometimes referred to and defined herein as a scene-brightness-to-display-brightness profile for the virtual content. For images having high overall scene brightness levels exceeding scene brightness level b3', the perceived display brightness will be capped at Bmax. In other words, the display brightness remains fixed at Bmax for all scene brightness levels greater than or equal to b3' (see, e.g., the slope of curve 114 remains flat for scene brightness levels beyond b3'). Scene brightness level b3' of FIG. 7 can be equal to or different than scene brightness level b3 of FIG. 6. For scene brightness levels between b1' and b2', curve 114 may coincide with dotted line 110. In other words, a third scene-to-display brightness mapping such as perceptual 1:1 nits-to-nits mapping can be provided for a certain range of scene brightness levels between b1' and b2' (e.g., to set the display brightness equal to, about equal to, or perceptually equal to the scene brightness). Scene brightness levels b1' and b2' of FIG. 7 can be equal to or different than scene brightness levels b1 and b2 of FIG. 6. For images having overall scene brightness levels ranging from b2' to b3', curve 114 may exhibit slope values that decrease from one (at scene brightness level b2') to zero (at scene brightness level b3').

For images having overall scene brightness levels ranging from b0' to b1' (e.g., at the lowest or very dark scene lux levels), curve 114 may remain fixed at a nominal low brightness level B0 (e.g., using a fourth scene-to-display brightness mapping). In other words, the fourth scene-to-brightness mapping can map scene brightness levels between b0' and b1' to a fixed display brightness level B0. Scene brightness level b0' of FIG. 7 can be equal to or different than scene brightness level b0 of FIG. 6. Maintaining the perceived display brightness level at some nominal level B0 using the fourth scene-to-display brightness mapping ensures that virtual content can remain visible to the user even at very low scene brightness level. Unlike images that are captured by image sensors 50, which can be susceptible to noise, virtual content being generated by graphics renderer 72 is not susceptible to the same sensor-related noise. Thus, no dimming is required for virtual content at low scene brightness levels. Brightness dimming controller 60 can adjust the virtual content dimming factor accordingly to ensure that the displayed brightness level of the virtual content maps to the profile of curve 114 shown in FIG. 7.

The example of FIG. 7 in which curve 114 has a portion or segment colinear with dotted line 110 is illustrative. In other embodiments, curve 114 need not have any extended portion that is colinear with dotted line 110 (e.g., there might be at most one or two points along curve 114 intersecting with dotted line 110). In other words, device 10 need not include any extended operating region that provides perceptual 1:1 nits-to-nits mapping for the virtual content. If desired, curve 114 need not be fixed to B0 for scene levels below b1' and can continue to track dotted line 110. If desired, curve 114 can optionally dip below dotted line 110 for scene levels below b1' (as shown in FIG. 6). If desired, curve 114 can optionally slope above dotted line 110 for scene levels below b1'.

Figure 8:
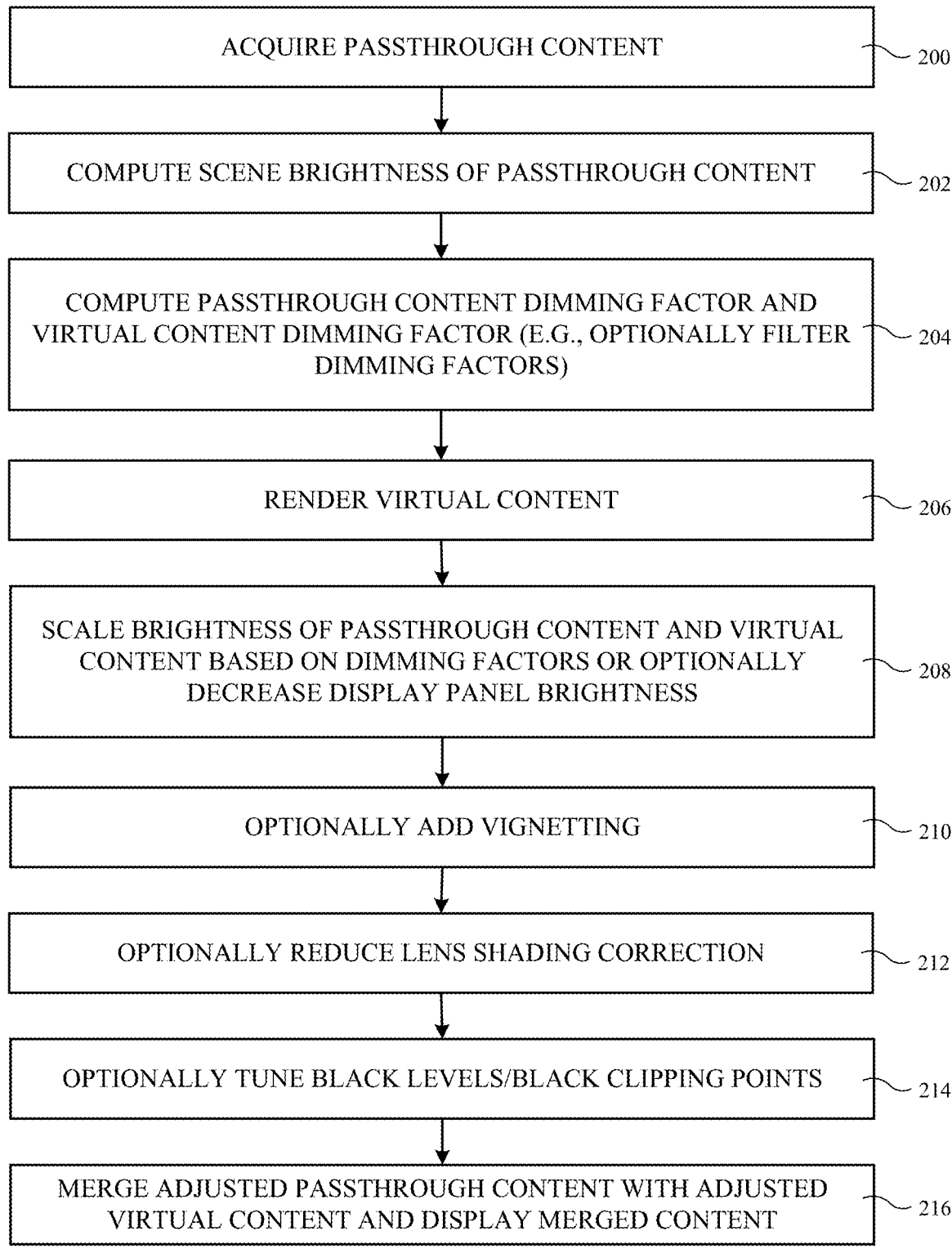
FIG. 8 is a flow chart of illustrative steps for operating an electronic device of the type shown in connection with FIGS. 1-7 in accordance with some embodiments.

FIG. 8 is a flow chart of illustrative steps for operating electronic device 10 of the type described in connection with FIGS. 1-7. During the operations of block 200, one or more front-facing or external-facing cameras 50 can be configured to acquire images of a scene for the passthrough content. The passthrough content is sometimes referred to as a live video feed of the external physical environment in which device 10 is operated.

During the operations of block 202, the brightness of the acquired images can be computed. For example, image signal processor 52 may be configured to compute an overall brightness level of the acquired images. The overall brightness level of the acquired images is sometimes referred to and defined herein as the scene brightness level. Image signal processor 52 may output passthrough content based on the acquired images. Additionally or alternatively, a dedicated ambient light sensor separate from cameras 50 can be employed to measure the ambient brightness level of the scene. If desired, parameters other than the brightness level of the captured images can be obtained during block 202. For example, image parameters such as the camera exposure time, an exposure target level, lens aperture (f-stop), ISO sensitivity value, brightness histogram, white balance, color profile, flash light settings (e.g., if a strobe or continuous lighting on device 10 is activated), and image stabilization capabilities (e.g., whether a camera and/or lens stabilization is enabled on device 10) can be obtained during this time.

During the operations of block 204, one or more dimming factors can be computed. For example, brightness dimming controller 60 can be configured to generate a passthrough content dimming factor and a virtual content dimming factor. The passthrough content dimming factor and the virtual content dimming factor may be computed based on the brightness level and/or other image parameters obtained during the operations of block 202. The passthrough content dimming factor may be adjusted so that the passthrough content is displayed in accordance with a scene-brightness-to-display-brightness profile (curve) 112 as shown in the example of FIG. 6. In particular, the passthrough content dimming factor may ensure that the display brightness is dimmed below the perceptual 1:1 nits-to-nits mapping at low(er) scene brightness levels.

The virtual content dimming factor may be adjusted so that the virtual content is displayed in accordance with a scene-brightness-to-display-brightness profile (curve) 114 as shown in the example of FIG. 7. In particular, the virtual content dimming factor may ensure that the display brightness is fixed at a nominal minimum display brightness level B0 at low(er) scene brightness levels. If desired, the passthrough content dimming factor can optionally be filtered to ensure that display brightness dimming adjustments are performed on the passthrough content gradually without any jarring effects. Similarly, the virtual content dimming factor can optionally be filtered to ensure that display brightness dimming adjustments are performed on the virtual content gradually without any jarring effects.

During the operations of block 206, virtual content can be generated. For example, graphics rendering subsystem 72 running on graphics processing unit 70 can be configured to render virtual (computer-generated) content. The virtual content can be rendered based on information associated with the user such as gaze data, head pose, or hand gestures. The virtual content can optionally be foveated based on the user's point of gaze. Graphics renderer 72 can synthesize photorealistic or non-photorealistic images based on one or more 2-dimensional or 3-dimensional model(s) defined in a scene file that contains information on how to simulate a variety of features such as information on shading (e.g., how color and brightness of a surface varies with lighting), shadows (e.g., how to cast shadows across an object), texture mapping (e.g., how to apply detail to surfaces), reflection, transparency or opacity (e.g., how light is transmitted through a solid object), translucency (e.g., how light is scattered through a solid object), refraction and diffraction, depth of field (e.g., how certain objects can appear out of focus when outside the depth of field), motion blur (e.g., how certain objects can appear blurry due to fast motion), and/or other visible features relating to the lighting or physical characteristics of objects in a scene. Although the operations of block 206 are shown as occurring after blocks 200, 202, and 204, the operations of block 206 can occur in parallel (simultaneously) with or before the operations of block 200, 202, or 204.

During the operations of block 208, the passthrough content dimming factor can be used to selectively dim the perceived brightness of the passthrough content (e.g., by opportunistically tuning the brightness of the passthrough content at brightness scaling block 62). Brightness scaling block 62 may be configured to digitally scale down all of the pixel values in the passthrough images. On the other hand, the virtual content dimming factor can be used to selectively dim the perceived brightness of the virtual content (e.g., by tuning the brightness of the virtual content at brightness scaling block 64). Brightness scaling block 64 may be configured to digitally scale down all of the pixel values in the virtual images. This example in which brightness scaling blocks 62 and 64 are configured to reduce the brightness of the passthrough/virtual content by digitally scaling down the pixels values is illustrative. In other embodiments, the brightness of the passthrough and virtual content can be reduced by optionally decreasing the brightness setting of the display (e.g., by reducing the display panel brightness).

During the operations of block 210, vignetting can optionally be added to the passthrough content and/or the virtual content. For example, the vignetting can dim a peripheral portion of the images being displayed (e.g., by adding a circular vignette, by dimming the top and bottom portions of the images, by dimming the left and right portions of the images, etc.). Introducing vignetting can further reduce the overall brightness of the images being displayed, which can help further perceptually mask noise that might otherwise be noticeable due to a degraded SNR.

During the operations of block 212, a lens shading correction operation that can be performed at the ISP block 52 can optionally be reduced for the passthrough content and/or the virtual content. Lens shading correction is an operation configured to compensate for lens vignetting, which can create a darkening effect towards the edges of an image. Thus, reducing such lens shading correction can help retain the vignetting or dimming effects near the peripheral portions of an image. Reducing lens shading correction can thus help reduce the overall brightness of the images being displayed, which can help further perceptually mask noise that might otherwise be noticeable due to a degraded SNR.

During the operations of block 214, the black levels and/or the black clipping points of the images can optionally be tuned for the passthrough content and/or the virtual content. For example, the black levels of the images being displayed can be adjusted so that the images appear more black or darker. As another example, the black clipping points of the images being displayed can be adjusted so that the images appear more black or darker. Adjusting the black settings of the images can thus help reduce the overall brightness of the images being displayed, which can help further perceptually mask noise that might otherwise be noticeable due to a degraded SNR.

Although the operations of blocks, 210, 212, and 214 are shown as occurring after the operations of block 208, the operations of blocks 210, 212, and/or 214 can occur prior to block 208. For example, the operations of blocks 210, 212, and 214 can occur at the ISP block 52 prior to any subsequent brightness scaling using the dimming factors.

During the operations of block 216, the selectively adjusted (scaled) passthrough content can be merged, blended, or otherwise combined with the selectively adjusted (scaled) virtual content. For example, media merging compositor 90 may be used to blend the passthrough content with the virtual content to output a corresponding merged or blended video content. The merged content can then be displayed on the one or more display(s) 14.

The operations of FIG. 8 are exemplary. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 5:
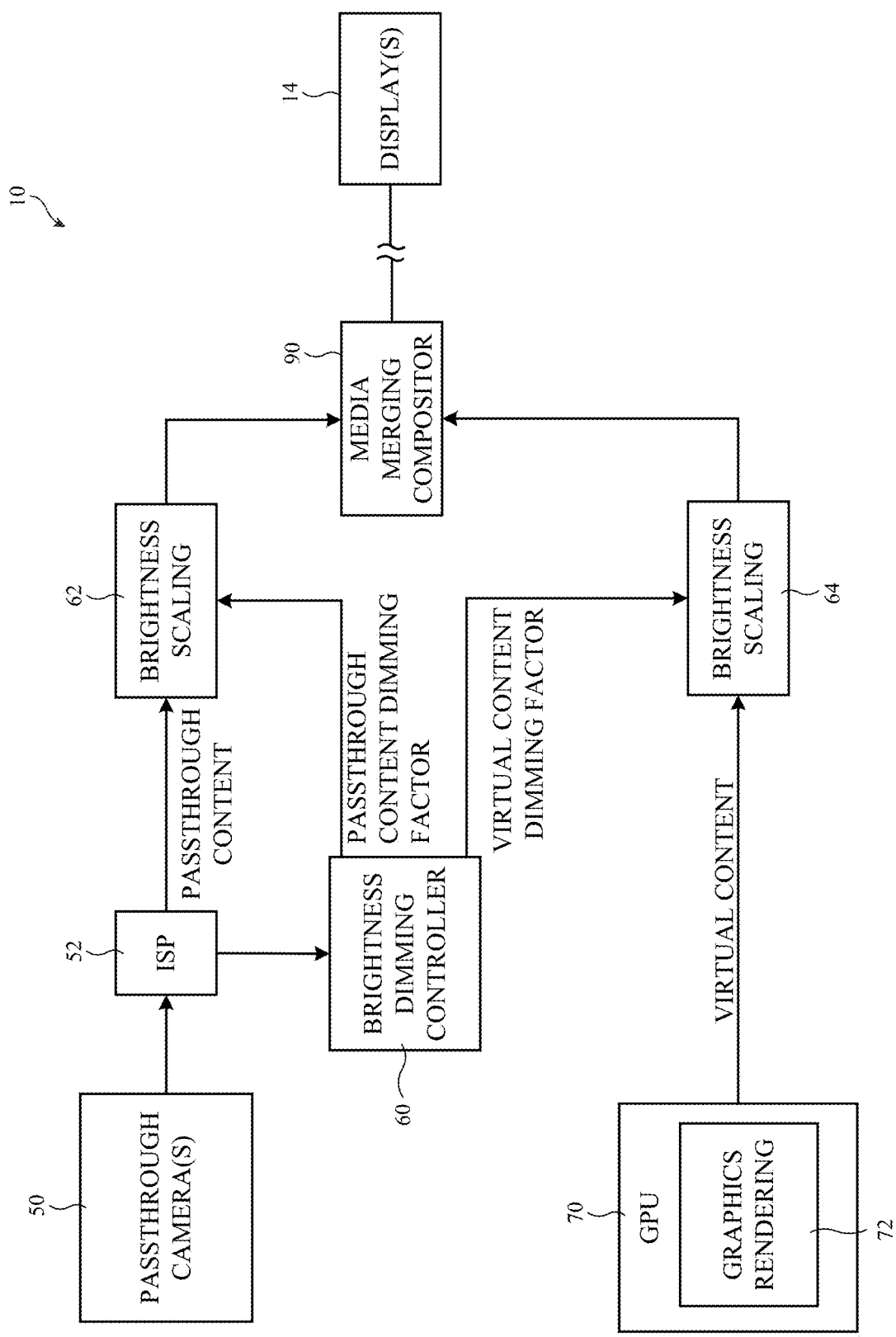
FIG. 5 is a diagram showing illustrative hardware and/or software subsystems within an electronic device configured to selectively perform content dimming in accordance with some embodiments.
Figure 9:
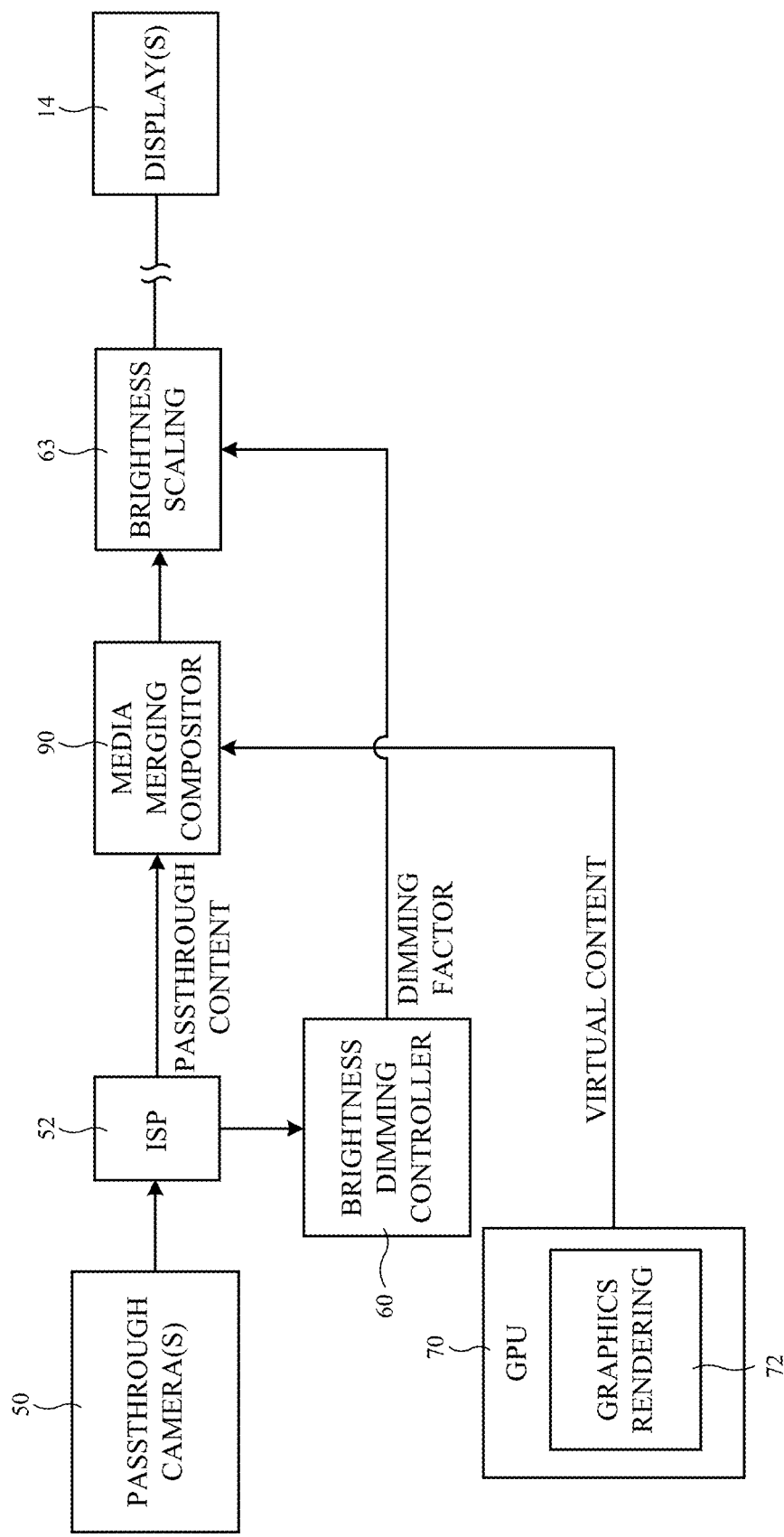
FIG. 9 is a diagram showing illustrative hardware and/or software subsystems within an electronic device configured to selectively perform brightness dimming on merged content in accordance with some embodiments.

The embodiment of FIG. 5 in which the brightness of the passthrough content and the brightness of the virtual content are selectively adjusted using brightness dimming controller 60 prior to the media merging operation is illustrative. FIG. 9 is a diagram showing another suitable embodiment of electronic device 10 that is configured to selectively perform brightness dimming on the merged content. As shown in FIG. 9, the virtual content output from graphics renderer 72 can be overlaid on top of the passthrough content output from ISP block 52 at media merging compositor 90 to output a corresponding merged video content. The merged video content can then be selectively adjusted at brightness scaling block 63. Brightness scaling block 63 can perform brightness dimming on the merged video content using a dimming factor output from brightness dimming controller 60.

For example, brightness dimming controller 60 might tune the dimming factor such that the merged video content being displayed is being adjusted in accordance with a scene-brightness-to-display-brightness profile (curve) 112 as shown in FIG. 6. In particular, the content dimming factor may ensure that the display brightness is dimmed below the 1:1 nits-to-nits mapping at low(er) scene brightness levels. If desired, the dimming factor can optionally be filtered to ensure that display brightness dimming adjustments are performed on the merged content gradually without any jarring effects. Configuring and operating device 10 in this way is technically advantageous and beneficial to lower the user's perception or sensitivity to noise to help offset the degraded SNR of images of dark scenes being displayed.

The methods and operations described above in connection with FIGS. 1-9 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device, comprising:
   with one or more image sensors, acquiring images of a scene;
   determining a scene brightness level of the acquired images;
   in response to determining that the scene brightness level is in a first range, displaying the acquired images in accordance with a first scene-to-display brightness mapping; and
   in response to determining that the scene brightness is less than the first range, displaying the acquired images in accordance with a second scene-to-display brightness mapping different than the first scene-to-display brightness mapping.

2. The method of claim 1, wherein the first scene-to-display brightness mapping comprises a mapping that matches a perceived brightness of the displayed images with the scene brightness level and that is implemented with a tone-mapping algorithm.

3. The method of claim 2, wherein the second scene-to-display brightness mapping is configured to reduce a brightness of the displayed images to be less than the scene brightness level.

4. The method of claim 1, further comprising:
   in response to determining that the scene brightness level is in a second range greater than the first range, displaying the acquired images such that the brightness of the displayed images is less than the scene brightness level.

5. The method of claim 4, further comprising:
   in response to determining that the scene brightness level is greater than the second range, displaying the acquired images using a fixed display brightness level.

6. The method of claim 4, further comprising:
   with a graphics rendering subsystem, generating virtual content; and
   merging the acquired images with the virtual content.

7. The method of claim 6, wherein displaying the acquired images in accordance with the second scene-to-display brightness mapping comprises selectively reducing the brightness of the displayed images to be less than the scene brightness level in response to determining that the scene brightness level is less than the first range prior to merging the acquired images with the virtual content.

8. The method of claim 6, wherein displaying the acquired images in accordance with the second scene-to-display brightness mapping comprises selectively reducing the brightness of the displayed images to be less than the scene brightness level in response to determining that the scene brightness level is less than the first range subsequent to merging the acquired images with the virtual content.

9. The method of claim 6, further comprising:
   in response to determining that the scene brightness level is in a third range, displaying the virtual content in accordance with a third scene-to-display brightness mapping that matches a brightness of the virtual content to the scene brightness level.

10. The method of claim 9, further comprising:
    in response to determining that the scene brightness level less than the third range, displaying the virtual content using a fixed display brightness level.

11. A method of operating an electronic device, comprising:
    with one or more cameras, acquiring images of a scene from which passthrough content is generated;
    with a graphics rendering subsystem, generating virtual content;
    controlling a brightness of the passthrough content in accordance with a first scene-brightness-to-display-brightness profile configured to mask noise in the acquired images when a scene brightness level of the acquired images is below a threshold; and
    controlling a brightness of the virtual content in accordance with a second scene-brightness-to-display-brightness profile.

12. The method of claim 11, wherein a first portion of the first scene-brightness-to-display-brightness profile coincides with a line having a slope of one, and wherein a second portion of the first scene-brightness-to-display-brightness profile corresponding to scene brightness levels below the threshold is lower than the line.

13. The method of claim 11, wherein the second scene-brightness-to-display-brightness profile is different than the first scene-brightness-to-display-brightness profile.

14. The method of claim 13, wherein a first portion of the second scene-brightness-to-display-brightness profile coincides with a line having a slope of one, and wherein a second portion of the second scene-brightness-to-display-brightness profile corresponding to scene brightness levels below an additional threshold is held at a fixed display brightness level.

15. The method of claim 11, wherein:
    controlling the brightness of the passthrough content in accordance with the first scene-brightness-to-display-brightness profile comprises selectively adjusting the brightness of the passthrough content based on a first dimming factor; and
    controlling the brightness of the virtual content in accordance with the second scene-brightness-to-display-brightness profile comprises selectively adjusting the brightness of the virtual content based on a second dimming factor.

16. The method of claim 15, further comprising:
filtering the first dimming factor; and
filtering the second dimming factor.

17. The method of claim 11, further comprising:
blending the virtual content with the passthrough content to generate a corresponding composited video feed; and
with one or more displays, outputting the composited video feed.

18. An electronic device comprising:
one or more cameras configured to acquire images of a scene;
an image signal processor configured to output passthrough content from the acquired images and to compute a scene brightness level of the acquired images;
a graphics rendering subsystem configured to generate virtual content;
a media merging subsystem configured to combine the passthrough content and the virtual content and to output corresponding merged video content;
one or more displays configured to output the merged video content; and
a brightness scaling subsystem configured to mask noise in the acquired images by dimming a brightness level of the passthrough content so that the brightness level of the passthrough content being presented on the one or more displays is less than the scene brightness level when the scene brightness level is less than a given threshold.

19. The electronic device of claim 18, wherein the brightness scaling subsystem is configured to control the brightness level of the passthrough content in accordance with a scene-brightness-to-display-brightness profile having a portion coinciding with a line having a slope of one when the scene brightness level is in a range greater than the given threshold.

20. The electronic device of claim 18, further comprising:
an additional brightness scaling subsystem configured to control a brightness level of the virtual content; and
a brightness dimming controller configured to output a first dimming factor to the brightness scaling subsystem and a second dimming factor to the additional brightness scaling subsystem.

21. The electronic device of claim 20, wherein the additional brightness scaling subsystem is configured to control the brightness level of the virtual content in accordance with a scene-brightness-to-display-brightness profile having a first portion coinciding with a line having a slope of one when the scene brightness level is in a range greater than an additional threshold and having a second portion with a fixed display brightness level when the scene brightness level is less than the additional threshold.

22. The electronic device of claim 18, wherein the brightness scaling subsystem is configured to receive the merged video content and is further configured to control a brightness level of the virtual content.

* * * * *